(12) United States Patent
Emigh

(10) Patent No.: US 8,965,892 B1
(45) Date of Patent: Feb. 24, 2015

(54) IDENTITY-BASED FILTERING

(76) Inventor: Aaron T. Emigh, Incline Village, NV (US)

( * ) Notice: Subject to any disclaimer, the term of this patent is extended or adjusted under 35 U.S.C. 154(b) by 1917 days.

(21) Appl. No.: 12/006,750

(22) Filed: Jan. 4, 2008

Related U.S. Application Data

(60) Provisional application No. 60/878,761, filed on Jan. 4, 2007.

(51) Int. Cl.
*G06F 17/30* (2006.01)

(52) U.S. Cl.
USPC ........................................................ 707/737

(58) Field of Classification Search
USPC .................................................. 707/737, 748
See application file for complete search history.

(56) References Cited

U.S. PATENT DOCUMENTS

| | | | |
|---|---|---|---|
| 2007/0133034 A1* | 6/2007 | Jindal et al. | 358/1.14 |
| 2008/0005223 A1* | 1/2008 | Flake et al. | 709/203 |
| 2008/0021958 A1* | 1/2008 | Foote | 709/204 |
| 2008/0062451 A1* | 3/2008 | Yamazaki | 358/1.14 |

* cited by examiner

*Primary Examiner* — Jean B Fleurantin

(57) ABSTRACT

In some embodiments, techniques for determining a reputation associated with an electronic document may include determining an identity associated with the electronic document; determining an identity reputation associated with the identity, and determining a document reputation using the identity reputation.

22 Claims, 3 Drawing Sheets

IDENTITY-BASED FILTERING

CROSS REFERENCE TO RELATED APPLICATIONS

This application claims priority to U.S. Provisional Patent Application No. 60/878,761, entitled IDENTITY-BASED SAFE SURFING, filed Jan. 4, 2007, which is incorporated herein by reference for all purposes.

FIELD OF THE INVENTION

The present invention relates generally to the area of computer software. More specifically, techniques for content filtering are disclosed.

BACKGROUND OF THE INVENTION

In consuming content, for example "surfing" the world wide web (including following a link, entering a URL, accessing a bookmark, and any other document retrieval), a variety of undesirable content may be encountered.

A variety of approaches to content filtering have been employed to avoid undesirable content. Examples of such approaches include blacklisting and whitelisting URLs and sites. However, such approaches fail to discriminate between specific content owners or creators within a site. In some cases particular participants in a site or service may have more desirable, or less desirable, content than other participants, and present approaches are unable to take advantage of this, leading to either inclusion of objectionable content, or exclusion of desirable content.

Accordingly, it would be useful to have improved filtering of content.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
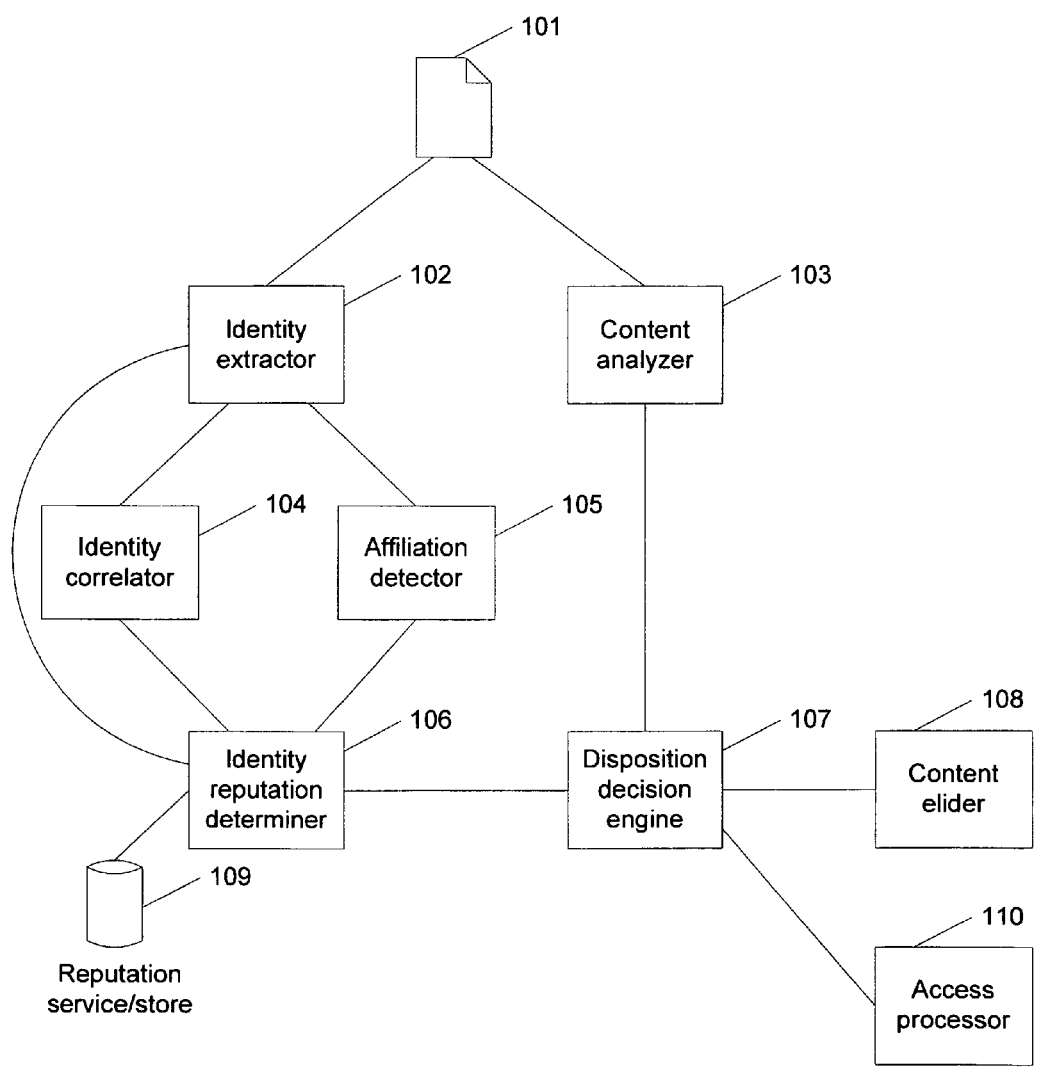
FIG. 1 is a diagram of a system for filtering based on identity, according to some embodiments.

FIG. 1 is a diagram of a system for filtering based on identity, according to some embodiments. In this example, a document and/or document metadata 101 is to be filtered. A document refers herein to any electronic document that is accessible via a network address such as a URL. Examples of a document include a web page, a PDF document, and a Flash document. As used herein, a document does not refer to a non-electronic document such as a printed document, nor to an electronic document not accessible via a network address, such as a local file not accessible via a network address, or an email. Document metadata refers herein to any information associated with a document, such as a URL associated with the document.

An identity extractor 102 may extract one or more identities from the document and/or document metadata 101. Examples of extracting an identity from a document and/or metadata are discussed in conjunction with FIG. 2, and include analyzing a URL associated with document metadata, and analyzing the document.

In some embodiments, a content analyzer 103 may analyze the document and/or document metadata 101. Examples of content analysis include keyword matching to detect objectionable content, Bayesian filtering, Support Vector Machine based analysis, and other content analysis technologies known to those skilled in the art. Further details of content analyzer 103 are discussed in conjunction with 206 of FIG. 2.

An identity correlator 104 may determine zero or more identities associated with an identity extracted by identity extractor 102. In some embodiments, an identity correlator 104 may be associated with an external service, for example a service accessible via a network such as the Internet. Examples of identity correlation are discussed in conjunction with FIG. 3.

An affiliation detector 105 may determine zero or more entities with which an identity extracted by identity extractor 102 is affiliated. Examples of such affiliations are discussed in conjunction with FIG. 3, and include membership in a group and a social connection.

An identity reputation determiner 106 may determine a reputation for a document 101. Examples of determining a reputation are discussed in conjunction with FIG. 3, and include various subsets and combinations of determining a reputation associated with an identity extracted by identity extractor 102, one or more identities determined by identity correlator 104, and affiliations determined by affiliation detector 105.

In some embodiments, a reputation service or store 109 may provide data to identity reputation determiner 106. In various embodiments, a reputation service or store 106 may be local or remote. Examples of reputation services and stores are discussed in conjunction with FIG. 3, and include local, remote and hybrid variants.

A disposition decision engine 107 may determine what action to take based on input from disposition decision engine 107 and/or content analyzer 103. Examples of operation of disposition decision engine 107 are discussed in conjunction with FIG. 2, and include denying access, providing access, eliding content via content elider 108, and delegating access control to access processor 110.

Content elider 108 may remove zero or more elements of content from document 101. An example of removing an element of content is to remove an element of a DOM, such as an element associated with an identity. For example, a comment may be removed from a page showing one or more comments. In another example, content relating to a social relationship with an undesirable or potentially undesirable person, or membership in an undesirable or potentially undesirable group, may be removed.

Access processor 110 may provide control over access. In one example, access processor 110 may log an access or access attempt. In another example, access processor 110 may present an authorization user interface, such as an input form including a password, and may provide or deny access based on acceptable proof of authorization.

In some embodiments, the system of this FIG. 1 may protect against presentation of undesirable content. An example of undesirable content is content of a category that is unwanted, such as obscene, pornographic, or blasphemous content. Another example of undesirable content is content associated with an undesirable person, organization or identity. In various embodiments, an undesirable entity such as a person, organization, group or identity may include an entity known to be undesirable, or an entity not known to be acceptable.

In some embodiments, filtration techniques shown in this FIG. 1 may be associated with a component associated with a document browser. An example of such a component is a plug-in to a web browser such as a Browser Helper Object, which in some embodiments may receive notification of navigation that may be associated with a URL, before or after loading a document associated with the URL. A "URL" refers herein to any network-based identifier by which a document may be accessed. In some embodiments, a URL may be associated with a document location, such as an HTTP URL. Another example of a component associated with a document browser is a module associated with a local document reader such as Adobe Acrobat. Another example of a component associated with a document browser is a component associated with rendering a document, for example a system resource such as a service provided by an operating system, which may be called, directly or indirectly, by a document browser.

In some embodiments, filtration techniques shown in this FIG. 1 may be associated with a proxy such as a web proxy, which may in various embodiments be local or remote.

Figure 2:
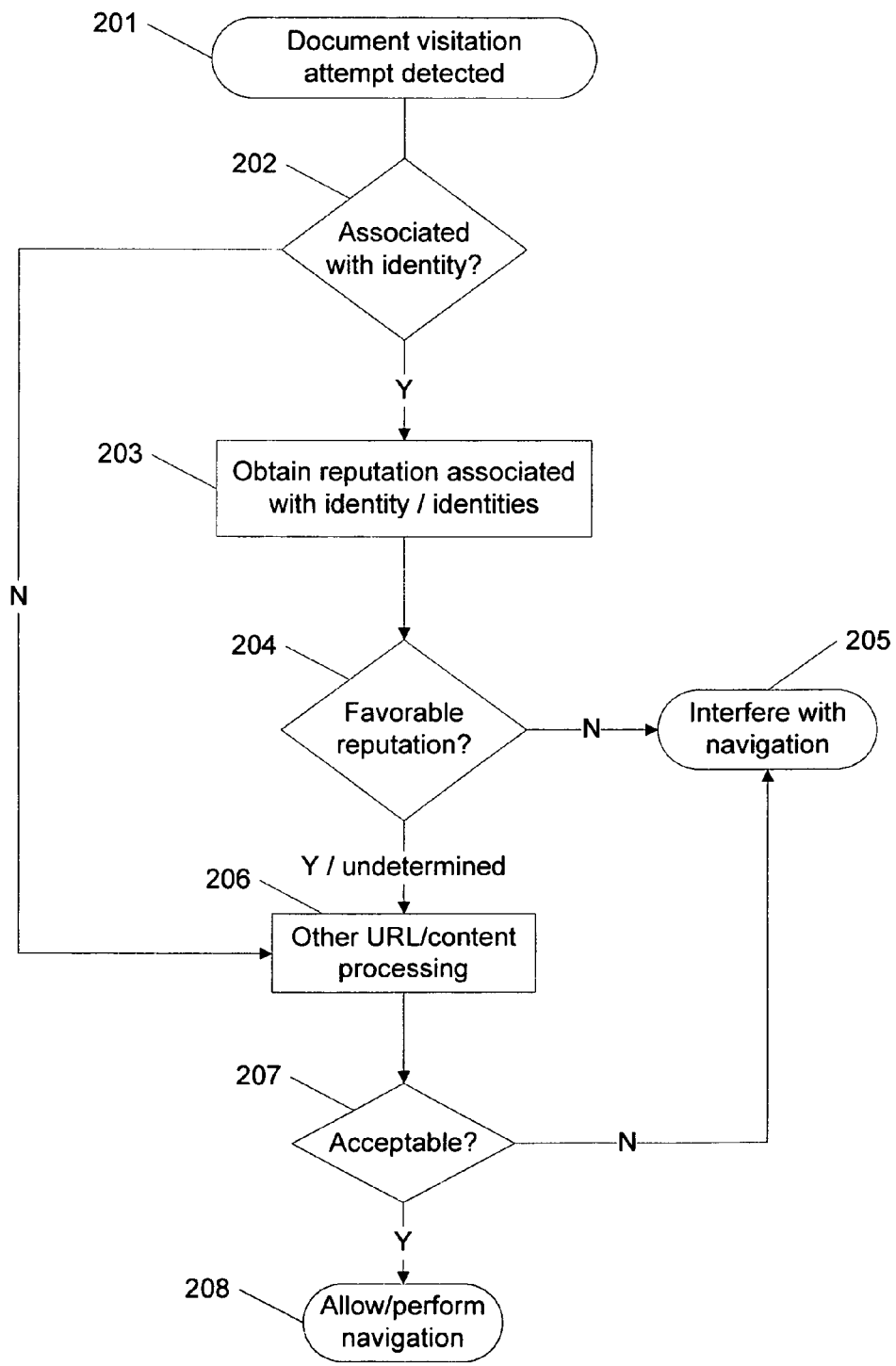
FIG. 2 is a flow diagram of a method for filtering based on identity, according to some embodiments.

FIG. 2 is a flow diagram of a method for filtering based on identity, according to some embodiments. In this example, a document visitation attempt is detected (201). An example of detecting a document visitation attempt is to detect the visitation attempt at a document browser component such as a web browser plug-in. In some embodiments, a document may be associated with a URL. In some embodiments, a visitation attempt may include a request to navigate to a document. In various embodiments, a visitation attempt may precede, include or follow retrieval of a document.

It may be determined whether the document is associated with an identity (202). Examples of a document associated with an identity include a profile page or journal-related page associated with a web site including social networking functionality related to an identity of an author/owner of the page, a document including a comment or message, such as a web page associated with a social network, journal, blog or other page accepting comments or messages, related to an author of the comment or message, and a document containing information relating to a social connection to a user associated with an identity. Examples of an identity include an identifier associated with a person, organization, or corporation. Examples of such an identifier include a user name, user ID, user number, email address, group name, group ID, group number, and any other identifier suitable for referring to an identity. An example of determining whether the document is associated with an identity is to determine whether a URL associated with the document is associated with an identity. An example of determining whether a URL is associated with an identity is to match the URL against a predetermined pattern such as a regular expression, wherein the pattern includes information related to an identity. An example of such a pattern is the pattern "http://profile.myspace.com/index.cfm?fuseaction=userviewprofile&friendid=*", wherein "*" is an exemplary representation of a pattern matching zero or more characters, which in various embodiments may be different, absent, or more specific, such as specifying a sequence of numbers or other valid identity-related identifier pattern.

In some embodiments, a URL associated with an identity may be associated with a profile page on a social network or other identity-related web site or service, as in the example above. In other embodiments, a URL associated with an identity may be associated with a weblog document, a comment document, or another type of document. In some embodiments, content of a document may be analyzed to determine an association between a document and one or more identities. For example, a document such as a web page may be analyzed to determine that it is associated with an author, comment, message, or social connection, wherein the author, comment, message or social connection is associated with an identity. Such analysis may include matching one or more regular expressions and/or other parsing, such as parsing, traversing or accessing a Document Object Model (DOM) associated with a web page or other structured document.

A reputation associated with one or more identities may be obtained (203). Examples of determining a reputation associated with an identity are discussed in conjunction with FIG. 3.

Figure 3:
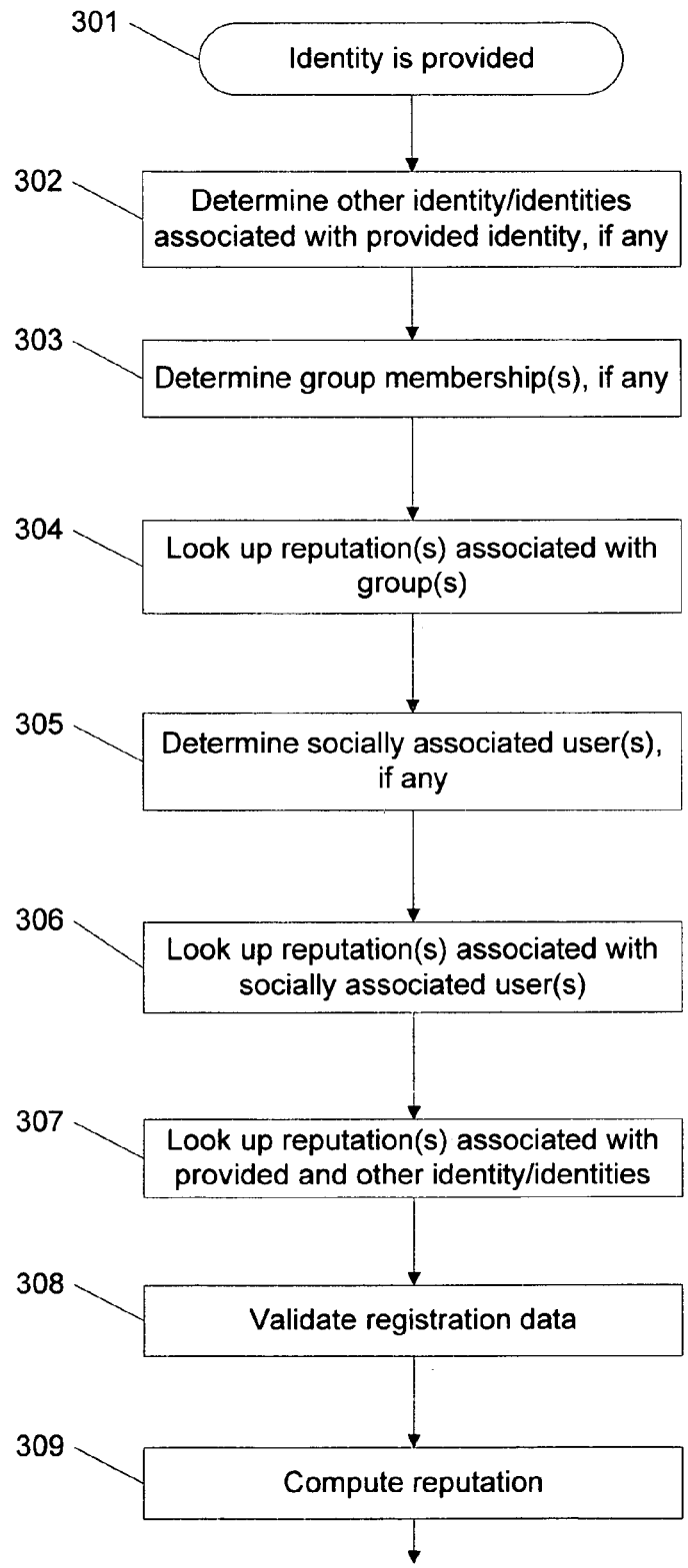
FIG. 3 is a flow diagram of a method for determining a reputation associated with an identity, according to some embodiments.

It may be determined whether the reputation associated with the identity is favorable (204), for example by comparing a reputation calculated as discussed in conjunction with FIG. 3 with a threshold, or by using enumerated values (such as binary or ternary values) provided as discussed in conjunction with FIG. 3.

If it is not determined that a reputation is favorable (204), then in this example navigation is interfered with (205). One example of interfering with navigation is to disallow such navigation, which may in various embodiments include preventing the document from being downloaded, or preventing a downloaded document from being displayed, in whole or in part. In some embodiments, interfering with navigation may include displaying a warning message and/or logging or transmitting information associated with the attempt to navigate to the blocked document. Another example of interfering with navigation is to present a warning including an option to authorize the navigation, and allow navigation only if it is authorized. In some embodiments, such authorization may be associated with receiving and verifying a password, and optionally logging and/or transmitting the access and/or the document. Another example of interfering with navigation is to modify the document, for example by removing data associated with an identity. An example of removing data associated with an identity from a document is to remove a comment associated with the identity from the document. Another example of removing data associated with an identity from a document is to remove a message associated with the identity from the document. Another example of removing data associated with an identity from a document is to remove a social relationship with someone associated with the identity. In some embodiments, such removals may be performed by removing elements of a DOM associated with identity-related content.

If it is determined that a reputation is favorable (204), or if the document was not determined to be associated with an identity (202), or in some embodiments (such as embodiments in which a ternary result of a reputation check is used) if it is neither determined that a reputation is favorable or unfavorable, then in some embodiments, other URL and/or content processing may be performed (206). In some embodiments, content processing may include retrieving a document, for example the document referred to by a URL. An example of URL processing is to determine whether a URL, or an element of a URL such as a domain and/or subdomain, is associated with a favorable or unfavorable reputation, for example via a whitelist or a blacklist. An example of content processing is to determine whether a document contains objectionable material such as pornographic, obscene, blasphemous or otherwise objectionable language, imagery, and/or multimedia content such as audio or video. In some embodiments, such checking may be done based on keyword matching. In some embodiments, such checking may be done using one or more adaptive filters such as Bayesian filters and/or support vector machines. Such filters are known to those skilled in the art. In some embodiments, training for an adaptive filter may include community feedback. In embodiments in which additional URL and/or content processing is performed (206), an evaluation that the URL and/or content is unacceptable (207) may result in interfering with navigation (205).

Navigation may be allowed or performed (208). An example of allowing navigation is to allow a browser to fetch a document associated with a URL. Another example of allowing navigation is to permit the display of the document. An example of performing navigation is to retrieve the document. Another example of performing navigation is to display the document.

FIG. 3 is a flow diagram of a method for determining a reputation associated with an identity, according to some embodiments. In this example, an identity is provided (301), for example as discussed in conjunction with 203 of FIG. 2.

Zero or more other identities associated with the provided identity may be determined (302), for example identities known or believed to correspond to the same individual as the provided identity. An example of determining another identity associated with a provided identity is to query an external service and provide information relating to the provided identity, such as a user ID, user name, email address or user number, and receive zero or more identities associated with the provided identity. Another example of determining another identity associated with a provided identity is to similarly consult an internal database, which in some embodiments may be updated from an external data source. In some embodiments, such an external service or external data source may be an overlay network such as a social network aggregator or identity provider. Examples of such services and data sources (some of which provide programmatic access via an API) include Spokeo (www.spokeo.com), elsewhere.im (www.elsewhere.im), Rapleaf (www.rapleaf.com), and Plaxo (www.plaxo.com). In various embodiments, an identity may become associated with a second identity by data mining, user assertions, user validation such as proving ownership of a user ID using a mechanism such as OpenID or by customizing a web page in a verifiable manner, and/or by providing credentials such as user names and passwords to prove identity.

Zero or more group memberships may be determined (303). In some embodiments, group memberships may be determined for a provided identity. In some embodiments, group memberships may be determined for a provided identity and one or more associated other identities. An example of determining a group membership for an identity is to query a social network or other group-related service for group membership associated with the identity, for example programmatically via an API or by retrieving one or more pages from the network and analyzing them to determine zero or more group memberships. In some embodiments, group membership information may be cached or otherwise stored and accessed independently from a social network.

Zero or more reputations associated with the group(s) may be looked up (304). Examples of determining a reputation are discussed in conjunction with 307, and may be applied to groups as described therein by using an encoding of a group, such as a group name, group ID, etc., in place of an encoding of an identity. In some embodiments, looking up a reputation associated with a group may include analyzing the name of the group and/or membership of the group, and/or analyzing content associated with the group, for example to determine whether objectionable content or one or more objectionable members are present.

Zero or more user identities associated with the provided identity may be determined (305). An example of such a user identity is a user identity associated with a user who is identified by the provided identity as being a social connection, for example via a friend, family, colleague or acquaintance connection in a social network. In some embodiments, determining user identities associated with a provided identity may include querying an external service (for example a service associated with the identity, or an overlay service such as discussed in conjunction with 302) and/or scraping one or more social relationships from one or more sets of one or more web pages, such as pages associated with a social network. In some embodiments, such pages may be associated with more than one identity, for example the associated other identities discussed in conjunction with 302.

Zero or more reputations associated with socially associated user(s) may be looked up (306). Examples of determining a reputation are discussed in conjunction with 307.

One or more reputations associated with the provided identity, and in some embodiments with one or associated identities such as those discussed in conjunction with 302, may be looked up (307). An example of looking up a reputation associated with an identity is to transmit data related to the identity, such as an encoding of the identity (e.g. a user name, email address, user ID, or user number, and in some embodiments may include information relating to a service related to the identity) or a function of an encoding of the identity such as a cryptographic hash, to an external service, and obtain an associated reputation in response. In various embodiments, such transmissions may be performed over a network such as the internet or a local area network using a protocol such as TCP/IP and/or HTTP and a data encoding such as XML or JSON. In some embodiments, an external service may be selected according to a service associated with the document. For example, a first service may be consulted for a document obtained from myspace.com (which may for example be determined via a domain and/or subdomain in a URL associated with the document) and a second service may be consulted for a document obtained from ebay.com.

Another example of looking up a reputation associated with an identity is to consult a local database or other data store, for example using the encoded identity or a function thereof as a key and obtaining an associated reputation if one is available. In some embodiments, such a local data store may be received and/or incrementally updated remotely over a network such as the internet or a local area network. In some embodiments, some reputations may be obtained locally and some may be obtained from one or more external services, for example based on an entity associated with the document as discussed above.

A response may be received from such a service, wherein the response includes information relating to a reputation (such as a binary or ternary value, or an integer or floating point value, or other indication of reputation).

In some embodiments, a reputation may be associated with a registration associated with the provided identity. In one example of registration-related data, data may have been received from a person associated with the identity indicating that the person fits a criterion, such as a maximum or minimum age, or is associated with an institution, such as a school, club, law enforcement agency, or professional organization. In another example of registration-related data, proof of identity may have been provided, such as a driver's license, passport, social security card. In another example of data that may have been provided at registration, proof of authorization may have been provided, such as a registration code, one-time or time-varying passcode.

In some embodiments, looking up a reputation may include checking one or more services and/or databases containing information relating to unfavorable reputations. Examples include criminal records, blacklists associated with bad behavior, membership in undesirable organizations, history of undesirable content creation or presentment, and other negative criteria.

In some embodiments, registration data may be validated to verify that a document is associated with an identity (308). In some embodiments, such validation may occur when an initial reputation check indicates a favorable reputation. In some embodiments, such validation may include retrieving a document relating to a service, and validating data associated with the document to confirm that it is associated with the identity. An example of verifying that the document is associated with an identity is to determine that the document contains registration-related data, such as a section of HTML such as a DIV tag with an identifier created for the provided identity and obtained either in combination with the reputation or separately, using a mechanism such as those discussed above in conjunction with obtaining the reputation. In such embodiments, a reputation may be determined not to be favorable if an additional content check fails.

In some embodiments, the presence of one or more verification data may be detected in a document, and a corresponding service may be consulted to determine a reputation, for example as discussed above. Such embodiments may include cases in which data relating to a registration or affiliation, such as data included by a user on his or her profile page on a social network or other identity-related document that includes user-modifiable content, claims a registration or affiliation, such as registration with a certifying organization or other identity-related or reputation-related registration.

A reputation may be computed (309). An example of computing a reputation is to use the reputation determined to be associated with the provided identity in 307. Another example of computing a reputation is to combine a reputation determined to be associated with the provided identity, if one is available, with reputation(s) associated with one or more groups associated with the provided identity, for example as discussed in conjunction with 304, reputation(s) associated with one or more associated other identities, for example as discussed in conjunction with 302, and/or reputation(s) associated with one or more users associated with the provided identity, for example as discussed in conjunction with 306, as available. An example of such a combination is to use "blacklisting," e.g. to determine that a reputation is favorable if no unfavorable reputation has been encountered from among the identities and/or groups associated with the provided identity. Examples of results of a reputation check that may indicate an unfavorable reputation include checking criminal records, blacklists associated with bad behavior, membership in undesirable organizations, history of undesirable content creation or presentment, and other negative criteria. Another example of such a combination is to use "whitelisting," e.g. to determine that a reputation is unfavorable unless a favorable reputation has been encountered from among the identities and/or groups associated with the provided identity. In some embodiments, such a favorable reputation may be associated with a registration associated with an identity. In one example of registration-related data, data may have been determined, for example data provided by a person associated with the identity, indicating that the person fits a criterion, such as a maximum or minimum age, or is associated with an institution, such as a school, club, law enforcement agency, or professional organization. In some embodiments, a favorable reputation may be associated with a certified affiliation with an organization, agency or group that performs validation such as a background check or identity verification is detected. In another example of registration-related data, proof of identity may have been provided, such as a driver's license, passport, social security card. In another example of registration-related data, proof of authorization may have been provided, such as a registration code, one-time or time-varying passcode.

In some embodiments, blacklisting or whitelisting may be used on a reputation associated with a provided identity, as described above wherein the only reputation used in the computation is a reputation associated with the provided identity.

Another example of such a combination is to combine whitelisting with blacklisting. An example of such a combination is a ternary result in which a reputation may be determined to be favorable, unfavorable or undetermined, for example by determining that a reputation is favorable if a relevant identity is determined to be associated with a whitelisted entity as described above, unfavorable if a relevant identity is determined to be associated with a blacklisted entity as described above, and undetermined if a relevant identity is not determined to be associated with either a favorable or unfavorable reputation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for determining a reputation associated with an electronic document accessible via a network address, comprising:
   determining an identity relating to a person, wherein the identity is associated with the electronic document;
   determining that the person is a member of a group, wherein the group is associated with a group-related service and wherein the group is associated with a group reputation;

determining an identity reputation, wherein the identity reputation is associated with the identity and wherein the identity reputation is based at least in part on the group reputation; and determining a document reputation, wherein determining the document reputation uses the identity reputation.

2. The method of claim 1, wherein determining the identity includes determining a URL, wherein the URL is associated with the network address; and determining a portion of the URL, wherein the portion of the URL is associated with the identity.

3. The method of claim 2, wherein the URL is associated with a social network.

4. The method of claim 1, wherein determining the identity reputation includes determining a social relationship between the identity and an acquaintance, wherein the acquaintance is socially connected to the identity, and determining a reputation associated with the acquaintance.

5. The method of claim 1, wherein determining the document reputation further comprises analyzing the document.

6. The method of claim 1, further comprising determining whether the document reputation is acceptable.

7. The method of claim 1, further comprising allowing navigation to the document.

8. The method of claim 1, further comprising removing data associated with the identity from the document, responsive to determining that the identity reputation is not favorable.

9. The method of claim 1, further comprising disallowing navigation to the document.

10. The method of claim 1, wherein the identity is associated with a comment, wherein the comment is associated with the document.

11. The method of claim 1, wherein the identity is associated with a message, wherein the message is associated with the document.

12. The method of claim 1, wherein the identity is associated with a social connection, wherein information relating to the social connection is associated with the document.

13. The method of claim 1, as a component of a web browser.

14. A system for determining a reputation associated with an electronic document accessible via a network address, comprising:
a processor configured to:
determine an identity relating to a person, wherein the identity is associated with the electronic document;
determine that the person is a member of a group, wherein the group is associated with a group-related service and wherein the group is associated with a group reputation;
determine an identity reputation, wherein the identity reputation is associated with the identity and wherein the identity reputation is based at least in part on the group reputation; and
determine a document reputation, wherein determining the document reputation uses the identity reputation; and
a memory coupled with the processor, wherein the memory provides instructions to the processor.

15. A non-transitory computer program product for determining a reputation associated with an electronic document accessible via a network address, the computer program product being embodied in a computer readable storage medium and comprising computer instructions for:
determining an identity relating to a person, wherein the identity is associated with the electronic document;
determining that the person is a member of a group, wherein the group is associated with a group-related service and wherein the group is associated with a group reputation;
determining an identity reputation, wherein the identity reputation is associated with the identity and wherein the identity reputation is based at least in part on the group reputation; and
determining a document reputation, wherein determining the document reputation uses the identity reputation.

16. The method of claim 1, wherein the group-related service is a social network.

17. The method of claim 1, wherein the group is associated with a blacklist and wherein the group reputation is associated with an unfavorable reputation.

18. The method of claim 1, wherein the group is associated with a whitelist and wherein the group reputation is associated with a favorable reputation.

19. The method of claim 1, wherein the group requires proof of possession of a government-issued identification credential for membership.

20. The method of claim 1, wherein determining that the person is a member of the group includes programmatically querying the group-related service via an API.

21. The method of claim 8, wherein the data associated with the identity includes a message.

22. The method of claim 8, wherein the data associated with the identity includes a comment.

* * * * *